United States Patent [19]

Yoshida

[11] Patent Number: 4,626,923
[45] Date of Patent: Dec. 2, 1986

[54] IMAGE PROCESSING APPARATUS

[75] Inventor: Tadashi Yoshida, Ichikawa, Japan

[73] Assignee: Canon Kabushiki Kaisha, Tokyo, Japan

[21] Appl. No.: 583,740

[22] Filed: Feb. 27, 1984

[30] Foreign Application Priority Data

Mar. 8, 1983 [JP] Japan ................................ 58-37725

[51] Int. Cl.[4] ........................................... H04M 1/40
[52] U.S. Cl. .................................. 353/283; 353/298; 375/22
[58] Field of Search ............... 358/283, 296, 298, 297; 375/22; 455/608

[56] References Cited

U.S. PATENT DOCUMENTS 4,347,523  8/1982  Ohara .................................. 358/298
4,384,297  5/1983  Ohara et al. ....................... 358/298

Primary Examiner—James J. Groody
Assistant Examiner—Edward L. Coles
Attorney, Agent, or Firm—Fitzpatrick, Cella, Harper & Scinto

[57] ABSTRACT

An image processing apparatus has a decoder for decoding input image data, a pulse width modulation circuit for producing a signal for pulse width modulation of a laser beam from a laser diode in accordance with decoded image data, and latch circuits to delay the output signal from the pulse width modulation circuit. The apparatus produces a half tone image with the center of each dot of each different size coinciding with that of a pixel.

10 Claims, 7 Drawing Figures

IMAGE PROCESSING APPARATUS

BACKGROUND OF THE INVENTION

1. Field of the Invention

The present invention relates to an image processing apparatus for processing image signals and, more particularly, to an image processing apparatus for reproducing an image of high quality.

2. Description of the Prior Art

In a conventional laser beam printer, a laser beam is modulated in accordance with a digital image signal, and a photosensitive body is scanned with the modulated laser beam through a rotary polygonal mirror so as to form a digital image. FIG. 1 shows an example of such a conventional laser beam printer. A semiconductor laser 1 produces a laser beam. A rotary polygonal mirror 2 deflects the laser beam from the laser 1 toward a photosensitive drum 3. In accordance with a digital image signal, the semiconductor laser 1 modulates the laser beam which becomes incident on the rotary polygonal mirror 2 rotating in the direction indicated by arrow A to scan the photosensitive body 3. The photosensitive body 3 is rotating in the direction indicated by arrow B, and an electrostatic latent digital image is formed on the photosensitive body 3.

In a conventional laser printer of this type, the laser beam is modulated in accordance with binary signals of "1" and "0" to form an image. Since the rise characteristics of the laser beam are abrupt, it is difficult to modulate power of the laser beam to reproduce an image of tonality due to the emission characteristics. The dither method is known as a method for reproducing an image of tonality (a half tone image) from binary signals. According to the dither method, tonality (a gray level) in an image is reproduced in accordance with the area ratio of black pixels to white pixels within each small image region. Therefore, if the number of threshold levels of the dither matrix is increased to reproduce an image of better tonality resolution is degraded. A method has been proposed to provide tonality in an output image by pulse width modulation of a laser beam. FIGS. 2 and 3 show a conventional example of an apparatus for performing this method. FIG. 2 shows an example of a pulse width modulation circuit for performing pulse width modulation of a 2-bit 4-value (4-level) digital image signal. A laser diode 1a generates a laser beam. Input terminals 2a and 3a receive 2-bit digital image signals (DATA 0 and DATA 1). A transfer clock CLK for transferring the 2-bit digital signals (DATA 0 and DATA 1) is supplied to a transfer clock input terminal 4. A clock CLKH having a frequency three times that of the transfer clock CLK is supplied to a clock input terminal 5. A decoder 6 decodes the 2-bit digital signals into a 4-bit digital signal.

A pulse width modulation circuit (PWM CCT) 7 generates clocks CLKH1, CLKH2 and CLKH3 of different pulse widths from the clock CLKH having the frequency three times that of the clock CLK. A latch circuit 8 latches the decoded 4-bit digital signal at the timing of the transfer clock CLK. The latch circuit 8 is connected to an OR gate 10 through one input terminal of each of AND circuits 9. A transistor 11 is inserted between the output terminal of the OR gate 10 and the laser diode 1a to drive the laser diode 1a.

The 2-bit digital signals (DATA 0 and DATA 1) received at the input terminals 2a and 3a are decoded by the decoder 6 into the 4-bit decoded signal. The upper three bits of the 4-bit decoded signal are latched by the latch circuit 8 at the timing of the transfer clock CLK. Meanwhile, the clock CLKH having the frequency three times that of the transfer clock CLK is converted by the pulse width modulation circuit 7 into the three clocks CLKH1, CLKH2 and CLKH3 having different duty ratios. FIG. 3A shows the waveforms of the respective clocks. Waveform (1) of the transfer clock CLK has a period T and a duty ratio 50%. Waveform (2) of the clock CLKH has a period T/3 and a duty ratio 50% and is synchronous with the transfer clock CLKH. The pulse width modulation circuit 7 modulates the clock CLKH having the period T/3 into the clocks CLKH1, CLKH2 and CLKH3 which have the period T and the duty ratios of $\Delta$, $\frac{2}{3}$ and 1, respectively, and have waveforms (3) to (5), respectively. The clocks CLKH1, CLKH2 and CLKH3 respectively correspond to (0, 1), (1, 0) and (1, 1) of the 2-bit digital signals (DATA 0 and DATA 1). These waveforms having the different duty ratios and the 4-bit decoded signal latched in the latch circuit 8 are gated by the AND gates 9 to have pulse widths corresponding to 2-bit digital image signals. The pulse modulated upper 3-bit decoded signal is converted into a 1-bit signal by the OR gate 10. The signal from the OR gate 10 drives the laser diode 1a through the transistor 11. Therefore, the pulse width of the modulation signal of the laser beam corresponding to the 2-bit digital image signals (DATA 0 and DATA 1), that is, the turn on timing and ON time of the laser beam become as shown in FIG. 3B. Accordingly, the pulse width modulated laser beams of "0", "1", "2" and "3" shown in FIG. 3B are produced in correspondence with the 2-bit digital signals (0, 0), (0, 1), (1, 0) and (1, 1), respectively. FIG. 3B also shows the position and size of the dots recorded on the photosensitive body. (In FIG. 3B, the hatched portion corresponds to an actual recorded portion. "0" in FIG. 3B represents a pixel of no recording content and "3" represents a maximum dot size for a pixel).

In a pulse width modulation method of the type described above, the centers (centers of the dots for pixels) of the pulse widths of the respective digital signals (0, 0), (0, 1), (1, 0) and (1, 1) differ from each other. Then, dots of the half tone image portion does not form a lattice shape (a regular matrix), which results in poor gradation, formation of interference fringes and so on.

SUMMARY OF THE INVENTION

The object of the present invention is to eliminate the above problems.

It is another object of the present invention to provide an image processing apparatus which is capable of producing an image output of high quality.

It is still another object of the present invention to provide an image processing apparatus which has a simple construction and which is still capable of controlling positions of recording dots of different sizes.

It is still another object of the present invention to provide an image processing apparatus which is capable of providing a color image output of high quality.

The above and other objects and advantages of the present invention will become apparent from the following description taken in conjunction with the accompanying drawings.

DETAILED DESCRIPTION OF THE PREFERRED EMBODIMENT

The preferred embodiment of the present invention will now be described with reference to the accompanying drawings.

Figure 1:
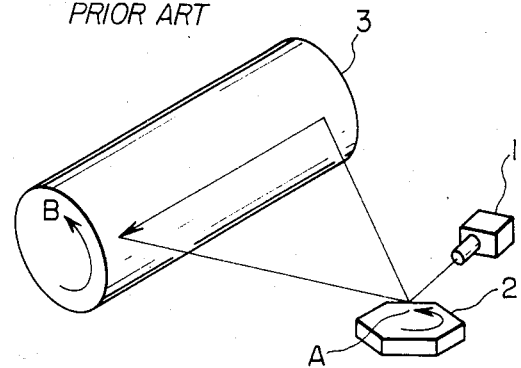
FIG. 1 is a schematic view of a conventional laser beam printer.
Figure 2:
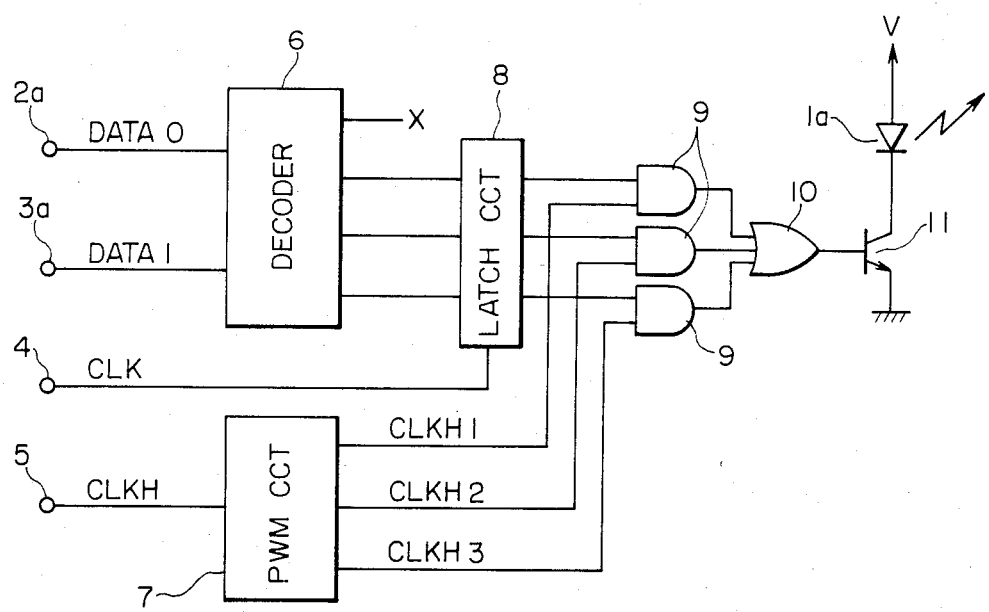
FIG. 2 is a circuit diagram of a conventional pulse width modulation circuit for pulse width modulating a 2-bit digital signal.
Figure 3A:
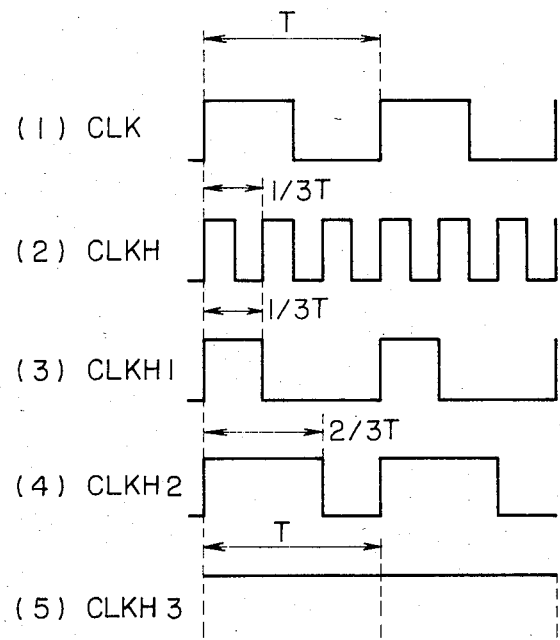
FIG. 3A is a timing chart showing the waveform of the clocks at the respective parts of the circuit shown in FIG. 2.
Figure 4:
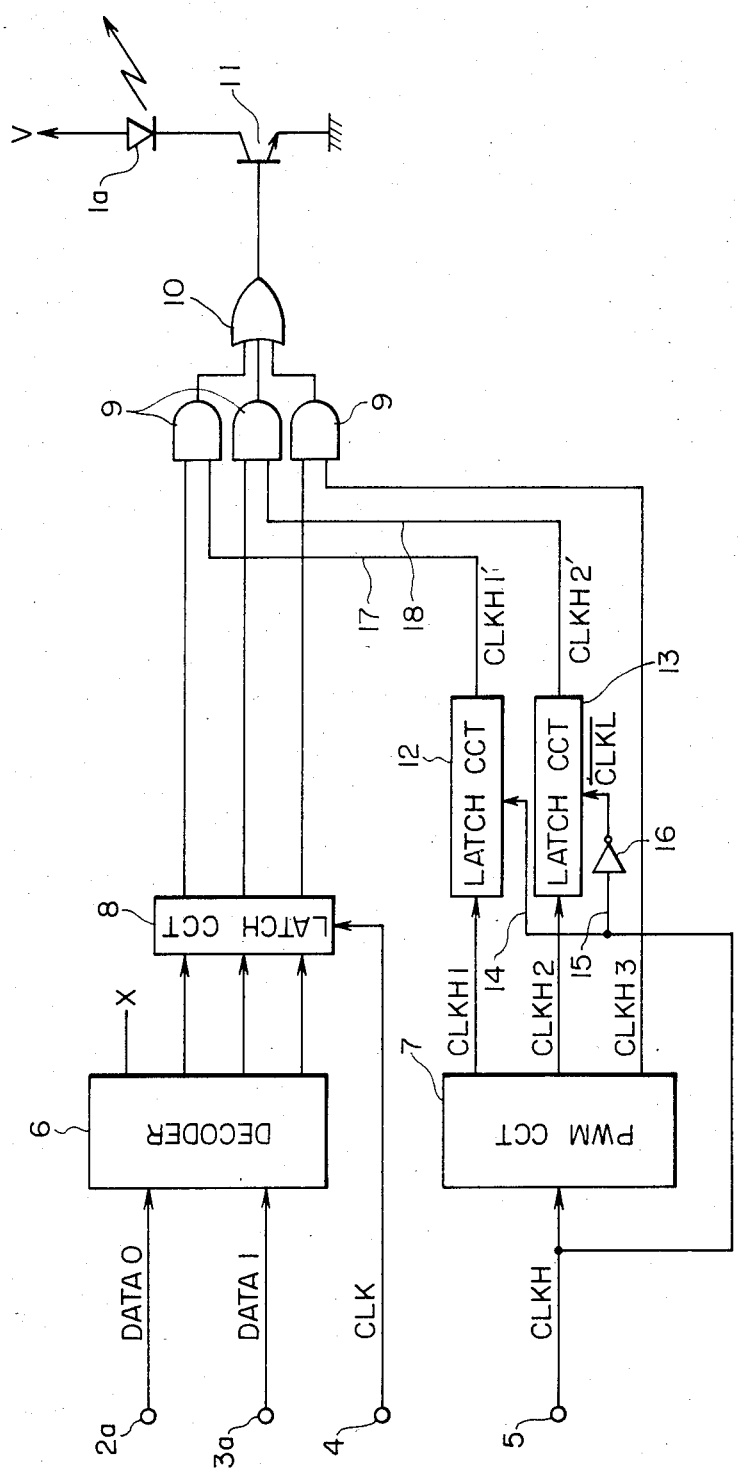
FIG. 4 is a circuit diagram for pulse width modulation according to an embodiment of the present invention.
Figure 5A:
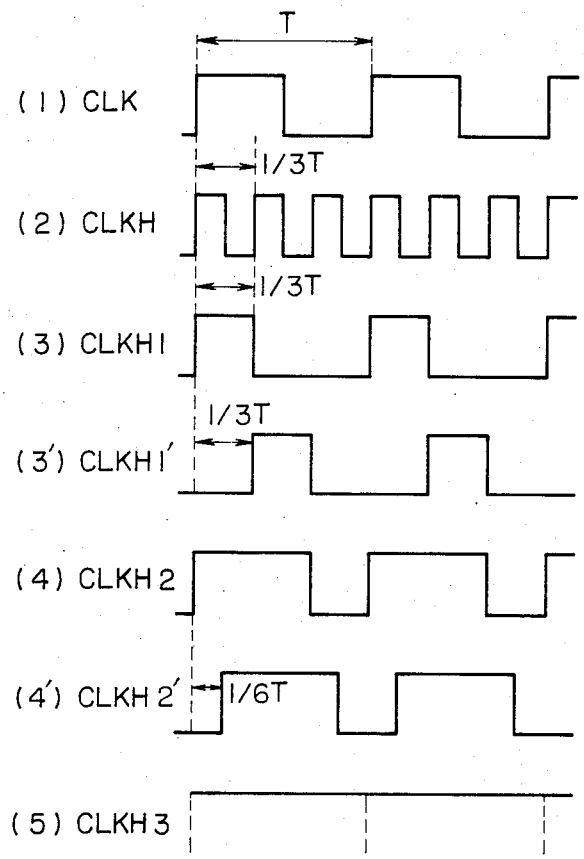
FIG. 5A is a timing chart showing the waveforms of the clocks at the respective parts of the circuit shown in FIG. 4.

FIG. 4 is a circuit diagram of an image processing apparatus according to an embodiment of the present invention. The same reference numerals as used in FIG. 2 denote the same parts in FIG. 4, and a detailed description thereof is omitted. Latch circuits 12 and 13 latch clock pulses CLKH1 and CLKH2 in synchronism with a clock CLKH. Signal lines 14 and 15 supply the clock CLKH to the latch circuits 12 and 13, respectively. An inverter 16 produces from the clock CLKH a clock $\overline{CLKH}$ which is 180° phase-shifted therefrom. FIG. 5A shows the waveforms of the clocks shown in FIG. 4; waveforms (1), (2), (3), (4) and (5) in FIG. 5A are the same as those shown in FIG. 3A. A transfer clock CLK has waveform (1). The clock CLKH having a frequency three times that of the transfer clock CLK has waveform (2). A clock CLKH1 has waveform (3), a clock CLKH2 has waveform (4), and a clock CLKH3 has waveform (5). In the circuit shown in FIG. 4, the clock CLKH1 is delayed for one period of the clock CLKH by the latch circuit 12 to produce a pulse CLKH1' of waveform (3)' which has a period T delayed by ΔT from the clock CLKH and a duty ratio of Δ. The signal CLKH1' is supplied to an AND circuit 9 through a signal line 17. The clock CLKH2 is delayed for ½ the period of the clock CLKH by the latch circuit 13 to produce a pulse CLKH2' of waveform (4)' which has a period T delayed by T/6 from the clock CLKH and a duty ratio of ⅔. The signal CLKH2' is supplied to another AND gate 9 through a signal line 18. Accordingly, the gate signals of the AND gates 9 which correspond to the 2-bit digital signals (0, 1), (1, 0) and (1, 1) have the waveforms (3)', (4)' and (5) having the duty ratios as shown in FIG. 5.

Figure 5B:
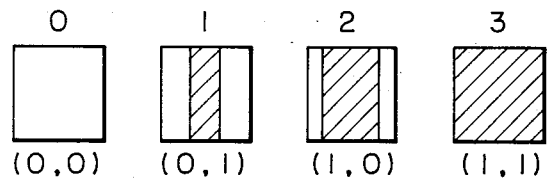
FIG. 5B is a representation showing the pulse widths of the laser beam modulation signals obtained by the pulse width modulation circuit shown in FIG. 4, or the positions and sizes of the dots recorded by the circuit shown in FIG. 4.

Therefore, the pulse widths of the laser beam modulation signals corresponding to the 2-bit digital signals (0, 0), (0, 1), (1, 0) and (1, 1), that is, the turning on timing and ON time of the laser beam become as shown in FIG. 5B.

Figure 3B:
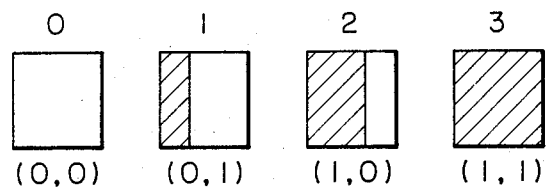
FIG. 3B is a representation showing the pulse widths of the laser beam modulation signals obtained by the pulse width modulation circuit shown in FIG. 2, or the positions and sizes of the dots recorded by the circuit shown in FIG. 2.

In this manenr, the laser beams "0", "1", "2" and "3" which are pulse width modulated as shown in FIG. 5B are produced in correspondence with the 2-bit digital signals (0, 0), (0, 1), (1, 0) and (1, 1). As in the case of FIG. 3B, FIG. 5B shows the positions and sizes of the recording dots on the photosensitive drum (the hatched portions in FIG. 5B represent actual recording dots). "0" in FIG. 5B indicates a pixel of no recording content, and "3" in FIG. 5B represents a maximum dot size for a pixel.

As may be seen from FIG. 5B, since the centers of the dots (central positions of the dots for pixels) can be aligned independently of digital values (image data), so that the image dots can be formed in a matrix form. Accordingly, the present invention provides an image processing apparatus capable of reproducing a half tone image of good quality. In the above embodiment, the center of each dot of each size is aligned at the central position of the pixel. However, a similar effect can be obtained if the generation timing of each clock is controlled such that the dot of each size constantly includes a center of one pixel (maximum recording dot). In the embodiment described above, a 2-bit digital signal is pulse width modulated. However, the centers of the dots can be aligned with the central positions of the pixels even if a digital signal of 3 bits or more is pulse width modulated. Furthermore, although the present invention is described with reference to a laser beam in the above embodiment, the present invention is similarly applicable to other types of image processing apparatuses. For example, the present invention can be applied to recording devices such as an ink jet printer, a thermal printer or the like, wherein an image is reproduced with a collective body of dots and the dot size is variable.

The present invention is also applicable to a color ink jet printer. In a color ink jet printer, when a red dot is printed on a yellow dot, the size of the red dot is changed in several ways, thereby realizing various color shadings. If the center of a red dot of each different size is superposed on the center of a yellow dot, an image of good color balance can be reproduced.

The present invention is not limited to the circuit described above and can be applied to similar circuits in which the positions of dots of different sizes can be controlled.

In summary, according to the present invention, an image output of good quality and excellent gradation can be obtained.

The present invention is not limited to the particular embodiment described above, and various changes and modifications may be made within the spirit and scope of the present invention.

What I claim is:

1. An image processing apparatus for processing image data to produce dots of various sizes to be recorded to reproduce an image, said apparatus comprising:

means for inputting image data; and
   means for forming a pulse-width modulated signal determining the size of a dot to be recorded in accordance with the value of image data input by said input means,
   said signal forming means including means for producing a plurality of different pulse-width modulated signals with the center of any dot to be recorded at any one location and determined by any one of said pulse-width modulated signals being the same, and means for selecting one of said plurality of pulse-width modulated signals in accordance with the value of the image data input by said input means.

2. An image processing apparatus according to claim 1, wherein said signal forming means includes means for generating a reference pulse signal, means for providing a plurality of pulse signals different in pulse-width from each other based on said reference signal, and means for delaying each of said plurality of pulse signals.

3. An image processing apparatus according to claim 2, further comprising means for producing a transfer clock for transferring said image data from said input means, wherein the frequency of said reference pulse signal is higher than that of said transfer clock.

4. An image processing apparatus according to claim 3, further comprising beam generating means for generating a beam in accordance with one of the pulse-width modulated signals.

5. An apparatus according to claim 1, wherein said input means has decoding means for decoding the image date to a plurality of bits.

6. An image processing apparatus for processing image data to produce dots of various sizes to be recorded to reproduce an image, said apparatus comprising:

means for inputting image data; and means for forming a pulse-width modulated signal determining the size of a dot to be recorded in accordance with the value of image data input by said input means, said signal forming means including means for producing a plurality of different pulse-width modulated signals with any dot to be recorded at any one location determined by any one of said pulse-width modulated signals encompassing at least the center of the largest dot to be recorded, and means for selecting one of said plurality of pulse-width modulated signals in accordance with the value of the image data input by said input means.

7. An image processing apparatus according to claim 6, wherein said signal forming means includes means for generating a reference pulse signal, means for providing a plurality of pulse signals different in pulse-width from each other based on said reference signal, and means for delaying each of said plurality pulse signals.

8. An image processing apparatus according to claim 7, further comprising means for producing a transfer clock from transferring said image data from said input means, wherein the frequency of said reference pulse signal is higher than that of said transfer clock.

9. An image processing apparatus according to claim 8, further comprising beam generating means for generating a beam in accordance with one of the pulse signal-width modulated signals.

10. An image processing apparatus according to claim 6, wherein said input means has decoding means for decoding the image data to a plurality of bits.

* * * * *